United States Patent
Hassan

(10) Patent No.: US 10,749,630 B2
(45) Date of Patent: *Aug. 18, 2020

(54) DYNAMICALLY PARTITIONING MEDIA STREAMS

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 469 days.

This patent is subject to a terminal disclaimer.

(21) Appl. No.: 15/392,201

(22) Filed: Dec. 28, 2016

(65) Prior Publication Data

US 2018/0183846 A1 Jun. 28, 2018

(51) Int. Cl.
*H04L 1/00* (2006.01)
*H04L 29/06* (2006.01)

(52) U.S. Cl.
CPC .......... *H04L 1/0042* (2013.01); *H04L 1/0002* (2013.01); *H04L 1/0041* (2013.01); *H04L 65/4069* (2013.01); *H04L 65/605* (2013.01); *H04L 65/607* (2013.01); *H04L 2001/0096* (2013.01)

(58) Field of Classification Search
CPC ... H04L 1/0002; H04L 1/0041; H04L 1/0042; H04L 65/4069; H04L 65/605; H04L 65/607; H04L 2001/0096
USPC ........................................................ 709/226
See application file for complete search history.

(56) References Cited

U.S. PATENT DOCUMENTS

| 7,542,456 | B2 | 6/2009 | Garg et al. |
| 7,548,937 | B2 | 6/2009 | Gu et al. |
| 7,633,919 | B2 | 12/2009 | Meier |
| 7,792,982 | B2 | 9/2010 | Padmanabhan et al. |
| 8,416,682 | B2 | 4/2013 | Li et al. |
| 9,055,508 | B2 | 6/2015 | Ji et al. |
| 2002/0174434 | A1 | 11/2002 | Lee et al. |
| 2010/0121971 | A1 | 5/2010 | Shao et al. |
| 2010/0328528 | A1* | 12/2010 | Eggert ................ H03M 13/356 348/425.2 |

(Continued)

FOREIGN PATENT DOCUMENTS

CN 105516109 A 4/2016

OTHER PUBLICATIONS

Johnson, et al., "DSR: The Dynamic Source Routing Protocol for Multi-Hop Wireless Ad Hoc Networks", Ad hoc networking, Addison-Wesley Longman Publishing Co, Jan. 5, 2001, pp. 1-25.

(Continued)

*Primary Examiner* — James E Springer
(74) *Attorney, Agent, or Firm* — NovoTechIP International PLLC

(57) ABSTRACT

Systems, methods, and software technology for partitioning media streams is disclosed herein. In an implementation, a network node receives a media stream for a multimedia session from an upstream node in a communication channel supporting the multimedia session, partitions the media stream into a plurality of sub-streams to vary a code rate of each sub-stream of the plurality of sub-streams relative to each other, and transmits the plurality of sub-streams to a plurality of downstream nodes over a plurality of channels supporting the multimedia session.

20 Claims, 6 Drawing Sheets

(56) References Cited

U.S. PATENT DOCUMENTS

| | | | |
|---|---|---|---|
| 2010/0332671 A1* | 12/2010 | Alfonso | H04L 12/6418 709/230 |
| 2011/0274155 A1* | 11/2011 | Noh | H04N 21/23439 375/240.01 |
| 2013/0222530 A1* | 8/2013 | Shanmukhadas | H04N 19/40 348/14.13 |
| 2015/0019750 A1* | 1/2015 | Wainner | H04N 5/765 709/231 |
| 2015/0043645 A1* | 2/2015 | Ventela | H04N 19/61 375/240.16 |
| 2016/0028610 A1 | 1/2016 | Kohli | |
| 2016/0255348 A1* | 9/2016 | Panchagnula | H04N 19/196 375/240.02 |
| 2016/0352783 A1* | 12/2016 | Hassan | H04L 65/1066 |
| 2018/0063218 A1* | 3/2018 | Kim | H04L 65/608 |
| 2018/0176535 A1* | 6/2018 | Ninan | G06F 3/013 |

OTHER PUBLICATIONS

Sundaram, et al., "A distributed bandwidth partitioning scheme for concurrent network-coded multicast sessions", In Proceedings of the 28th IEEE conference on Global telecommunications, Nov. 30, 2009, 2 pages.

Setton, et al., "Congestion-optimized multi-path streaming of video over ad hoc wireless networks", In Proceedings of IEEE International Conference on Multimedia and Expo, Jun. 27, 2004, 2 pages.

* cited by examiner

FIGURE 4 (400)

| Bit Stream C(1/3) | Partition Code PC1 | Sub-Stream C1(2/3) | Sub-Stream C2(2/3) |
|---|---|---|---|
| 1 | 1 | 1 |   |
| 0 | 0 |   | 0 |
| 1 | 0 |   | 1 |
| 1 | 0 |   | 1 |
| 0 | 1 | 0 |   |
| 0 | 1 | 0 |   |
| 1 | 1 | 1 |   |
| 1 | 0 |   | 1 |
| 1 | 0 |   | 1 |
| 1 | 0 |   | 1 |
| 1 | 1 | 1 |   |
| 0 | 1 | 0 |   |
| 1 | 1 | 1 |   |
| 0 | 0 |   | 0 |
| 0 | 0 |   | 0 |
| 0 | 0 |   | 0 |
| 0 | 1 | 0 |   |
| 1 | 1 | 1 |   |
| 1 | 1 | 1 |   |
| 0 | 0 |   | 0 |
| 0 | 0 |   | 0 |
| 1 | 0 |   | 1 |
| 1 | 1 | 1 |   |
| 1 | 1 | 1 |   |

FIGURE 5 (500)

| Bit Stream C(1/3) | Partition Code PC2 | Sub-Stream C1(2/3) | Sub-Stream C2(2/3) |
|---|---|---|---|
| 1 | 0 |   | 1 |
| 0 | 1 | 0 |   |
| 1 | 1 | 1 |   |
| 1 | 0 |   | 1 |
| 0 | 0 |   | 0 |
| 0 | 1 | 0 |   |
| 1 | 0 |   | 1 |
| 1 | 1 | 1 |   |
| 1 | 0 |   | 1 |
| 1 | 0 |   | 1 |
| 0 | 1 | 0 |   |
| 1 | 0 |   | 1 |
| 0 | 1 | 0 |   |
| 0 | 1 | 0 |   |
| 0 | 0 |   | 0 |
| 0 | 0 |   | 0 |
| 1 | 1 | 1 |   |
| 1 | 0 |   | 1 |
| 0 | 1 | 0 |   |
| 0 | 0 |   | 0 |
| 1 | 0 |   | 1 |
| 1 | 1 | 1 |   |
| 1 | 1 | 1 |   |

DYNAMICALLY PARTITIONING MEDIA STREAMS

TECHNICAL BACKGROUND

Error correction encoding is employed in a variety of settings to improve the reliability of data. At a basic level, error correction encoding introduces redundancy into a bit stream to increase the probability that the information in the bit stream is transferred successfully from one end of a channel to another. For example, error correction encoding is used when data is written to disk, communicated wirelessly, or otherwise transferred over a noisy channel that introduces errors into the data.

While typically employed in the lower layers of a communications stack, some applications employ error correction to improve the reliability of their data. Voice and video applications may encode their media streams, for example, to ensure that their conversations, video clips, or other such content reach their destination intact. An encoded media stream will have a level of redundancy that may be expressed in terms of a code rate. For instance, a one-half code rate would indicate that half of the bits in an encoded media stream are redundant relative to the original bits in the stream.

Even when an application protects its media stream with error correction encoding, the media stream may still be at risk due to the fundamental characteristics of the channel being used to communicate the data. The wireless link between a client and a wider network may be vulnerable to performance degradations, for example, as may be the switches, routers, repeaters, and other elements of the wider network.

OVERVIEW

Technology is disclosed herein that may be employed in a communication node to partition a media stream into multiple sub-streams having varied code rates relative to each other. The node receives the media stream from an upstream node that supports a multimedia session. The media stream may already be encoded with one code rate such that, when it is partitioned, results in at least two sub-streams having code rates that vary relative to each other and relative to the first code rate. The sub-streams may then be transmitted downstream to other nodes. In some implementations, one or more of the downstream nodes may further-partition one or more of the sub-streams. In other implementations, the upstream node may be the source of the media stream (e.g. a user device). In this manner, the media stream may be more reliably communicated to a receiving end, even as the performance of a given point in a communication channel or channels varies.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a stage in a partitioning process in an implementation.

FIG. 5 illustrates another stage in a partitioning process.

TECHNICAL DISCLOSURE

Technology is disclosed herein that allows an encoded media stream received from an upstream node in a communication channel to be partitioned into sub-streams having different code rates relative to each other. The sub-streams may then be transmitted to different downstream nodes for delivery to a destination. In some implementations, a given sub-stream may be further partitioned into its own sub-streams, each of which may then be encoded at different code rates. But when combined at the receiving end, the combined bit stream may have a code rate the same as the original code rate. Utilizing different code rates for the various sub-streams may have the technical effect of increasing the overall reliability and efficiency of the media stream.

In some implementations, the partition schema is determined on-board the node that receives the media stream (or sub-stream) and performs the partitioning. While in some implementations the node may be a router, switch, hub, wireless access points, or other such network element, in other implementations the node may be the source of the media stream (e.g. a mobile phone, tablet, laptop, desktop, or other such computer). However, in other implementations the local node performing the partitioning may offload such a determination to a remote service ("in the cloud"). The service may evaluate performance characteristics of a path to ascertain a partition schema for splitting a media stream into sub-streams.

In some implementations involving two partitioned sub-streams, one sub-stream may be considered a primary sub-stream while the other may be considered a secondary sub-stream. The original stream may be partitioned such that the secondary sub-stream has a greater amount of redundancy relative to the redundancy of the primary sub-stream. In some scenarios, the redundancy of the primary sub-stream may be a minimum allowable amount to achieve a threshold error rate, while the secondary sub-stream may have the remaining redundancy from the original sub-stream. The secondary sub-stream may then have sufficient redundancy remaining to allow it to be further partitioned into its own two or more sub-streams having varying levels of redundancy (or code rates), and so on, potentially forming a daisy chain of partitioned sub-streams.

Figure 1:
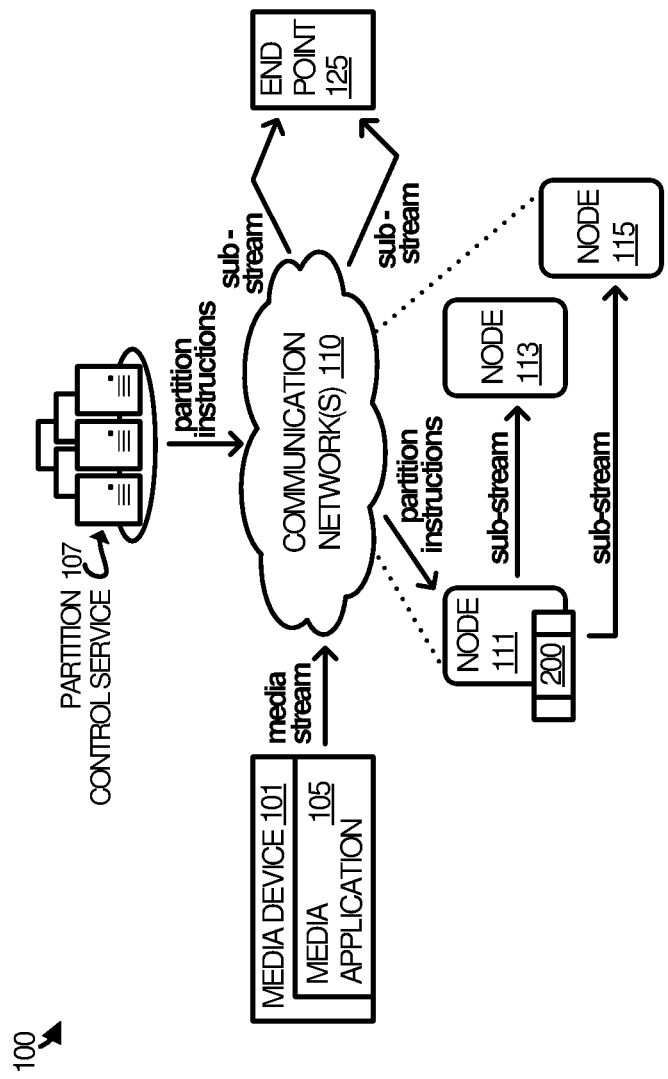
FIG. 1 illustrates an operational environment in an implementation of media stream partitioning.

FIG. 1 illustrates operational environment 100 in an implementation. Operational environment 100 includes media device 101, end point 125, and communication network 110. Communication network 110 includes various nodes, represented by node 111, node 113, and node 115. Operational environment 100 also includes partition control service 107, which may communicate with one or more of nodes 111, 113, and 115 to control the partition of one or more media streams sent from media application 105 on media device 101.

Media device 101 is representative of any device capable of hosting a media application and communicating with one or more end points. Examples of media device 101 include, but are not limited to, mobile phones, table computers, laptop computers, desktop computers, and any other variation or combination thereof. Media device 101 may include various hardware and software elements, examples of which are described below with respect to computing system 701 in FIG. 7. End point 125 is also representative of such devices. A user operating media device 101 may engage with end point 125 in a voice or video telephony session (call), a media download session, a media upload session, or any other type of data transfer or exchange between end points.

Media application 105 runs on media device 101. Examples of media application 105 include telephony applications (voice and video calling), messaging applications, and chat applications, as well as any variation or combination thereof. Media application 105 may be implemented as a stand-alone application, as a distributed application, or as an integrated component of one or more other applications. Examples of multimedia sessions include, but are not limited to, voice calls, video calls, voice/video conferences, whiteboard sessions, text and video chats, data uploads (e.g. video and photo uploading), file sharing sessions, and any combination or variation thereof.

Partition control service 107 is a service capable of formulating and providing partition instructions to one or more nodes in a communication network. Partition control service 107 may be implemented as a stand-alone service or as a sub-service integrated within the context of a larger service, such as Skype®, Skype® for Business, and Office 365®. Partition control service 107 may be implemented in software executed by one or more physical or virtual server computers, such as computing system 701 in FIG. 7.

The partition instructions may specify how a network node is to partition an encoded media stream. The media stream may comprise an encoded bit stream. The encoding may comprise forward error correction encoding that adds redundant bits to an original media stream, which may itself be compressed or uncompressed at the time of encoding. The partition instructions specify at what interval to split the bit stream into multiple bit streams. For example, the partition instructions may specify that the bit stream be split evenly into two or more streams, weighted unevenly amongst two or more streams, or otherwise partitioned. In a simple example, one-quarter of the bits may be allocated to one sub-stream, while three-quarters of the bits may be allocated to another sub-stream.

Communication network 110 is representative of one or more networks over which media device 101 may communicate with end point 125. Examples of communication network 110 include, but are not limited to, wireless networks, wired networks, local area networks (LANs), wide area networks (WANs), virtual networks, software defined networks, internets, intranets, the Internet, or any other type of network or combination thereof.

Node 111, node 113, and node 115 are representative of the various network elements that may comprise communication network 110. Examples include, but are not limited to, switches, routers, repeaters, wireless access points, bridges, hubs, servers, and any physical, virtual, or logical variation or combination thereof. Nodes 111, 113, and 115 may each include various hardware and software elements, examples of which are described below with respect to computing system 701 in FIG. 7.

Figure 2:
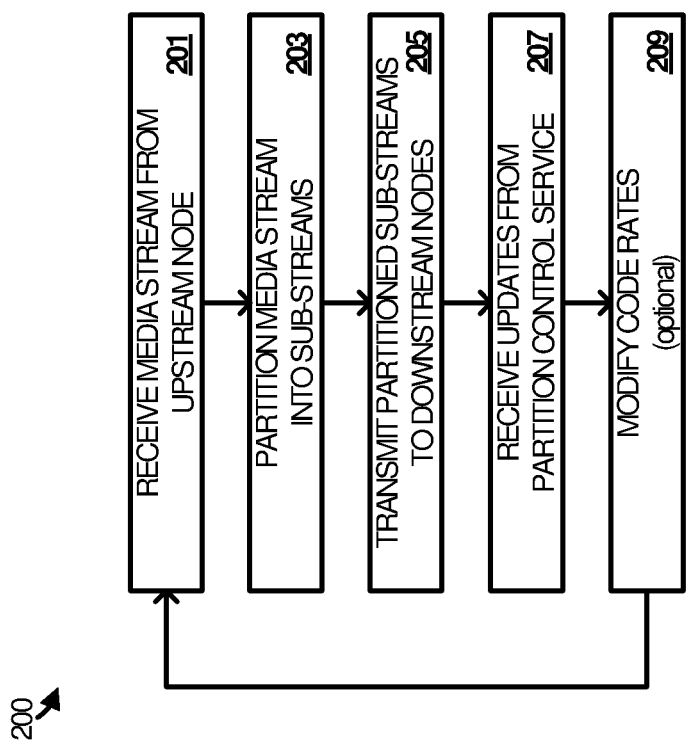
FIG. 2 illustrates a partition process employed by a media application in an implementation of media stream partitioning.

FIG. 2 illustrates partition process 200, which may be employed by any one or more of nodes 111, 113, and 115 to provide partitioning capabilities for media streams. Partition process 200 may be implemented in program instructions in the context of the software programs, modules, and components, as well as firmware and hardware, that comprise the nodes. The program instructions direct a given network node to operate as follows, referring parenthetically to the steps illustrated in FIG. 2.

In operation, a network node under the control of partition process 200 receives a media stream from an upstream node (step 201). The upstream node may be, for example, another node in a communication network or the source of the media stream, even. Examples of the media stream include, but are not limited to, voice or video telephony communications, file transfers, music or movie downloads, or any other type of content.

The network node partitions the media stream into sub-streams, such that each sub-stream has a different code rate relative to the other[s] (step 203). The node transmits each partitioned sub-stream two a different downstream node relative to the other, so that the sub-streams take different paths to their destination (step 205).

The partitioning occurs per instructions provided by a partition control service. Accordingly, the network node may receive updates from the partition control service periodically or on an ad-hoc basis (step 207). If called for by the instructions, the code rates of the sub-streams may change (step 209). For example, a sub-stream may have one code rate at the beginning of a media session and then a different code rate at the end. The partition control service may update the partition instructions in view of quality, congestion, or other such performance concerns along the path(s) to an endpoint.

Figure 3:
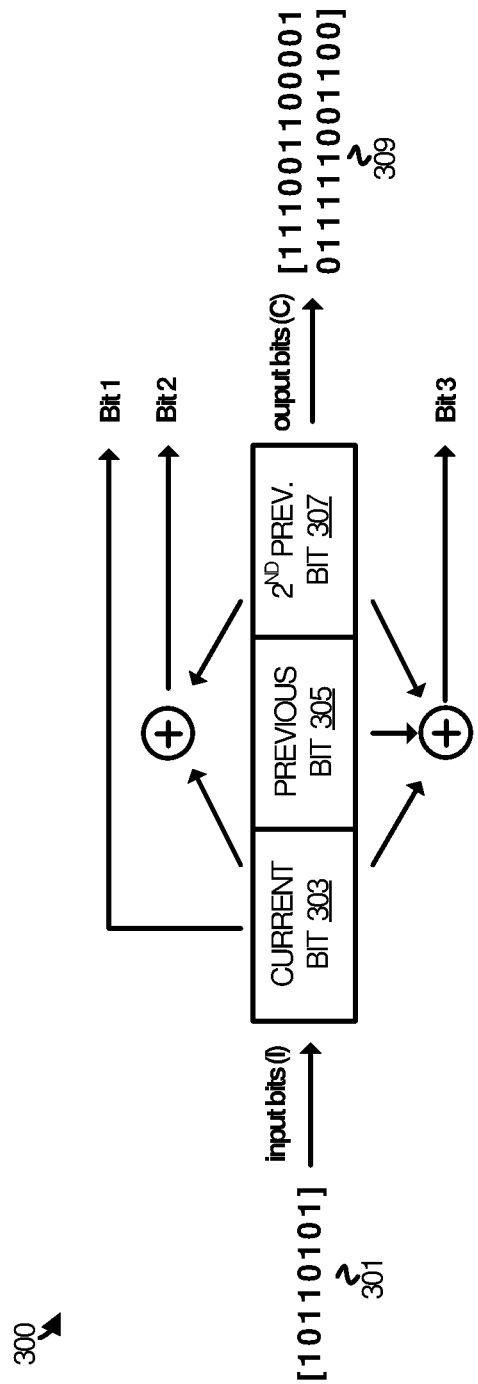
FIG. 3 illustrates an encoding process in an implementation.

FIG. 3 illustrates an encoding process 300 in an implementation which, in conjunction with FIG. 4 and FIG. 5, demonstrates various aspects of media stream partitioning. With respect to encoding process 300, a media stream 301 may be input to the process. The media stream 301 includes a set of input bits [10110101].

Any current bit 303 may be redundantly encoded by replicating the current bit, performing an AND operation on the current bit 303 and the $2^{nd}$ previous bit 307 relative to the current bit 303, and performing an AND operation on the current bit 303, the previous bit 305, and the $2^{nd}$ previous bit 307. Thus, input bits [10110101] produce an encoded output bit stream 309 of [111001100001011111001100]. Such encoding produces an encoded bit stream at a 1/3 code rate.

In FIG. 4, the encoded bit stream from FIG. 3 is input to a partition process 400, which partitions the encoded bit stream into sub-streams using a partition code (schema, instructions). In this example, the first partition code PC1 is [110001110001110001110001]. The first partition code may be used to allocate a given bit from the encoded bit stream to either the first sub-stream C1 or the second sub-stream C2. The partitioning results in an equal partitioning such that each sub-stream has a 2/3 code rate. This may be desirable when, for instance, the quality and performance of two or more wireless links are similar.

For example, wherever the first partition code has a "1," its corresponding bit from the encoded bit stream is allocated to the first sub-stream C1. Wherever the first partition code has a "0," the corresponding bit from the encoded bit stream is allocated to the second sub-stream C2. Accordingly, the partitioning produces a sub-stream C1 of [111101011001] and a sub-stream C2 of [100000111110.]

As discussed above, the partition schema may change over time. Partition process 500 in FIG. 5 illustrates what may occur when the partition code changes from PC1 to PC2. PC2 is given by [10001010011010010100110]. Applying PC2 again to the same encoded bit stream for exemplary purposes results in a C1 of [1010001010] and a C2 of [11010011111011.]

It may be appreciated that whereas PC1 results in sub-streams of equal length (12 bits), PC2 results in sub-streams of different lengths (10 and 14 respectively). Thus, PC2 is modeled so as to provide greater redundancy over one channel versus another. This may be desirable when the quality and performance of one is worse than another. In fact, C1 has a code rate of 4/5 (10 bits produced from 8 bits) while C2 has a code rate of 4/7 (14 bits produced from 8 bits).

Figure 6:
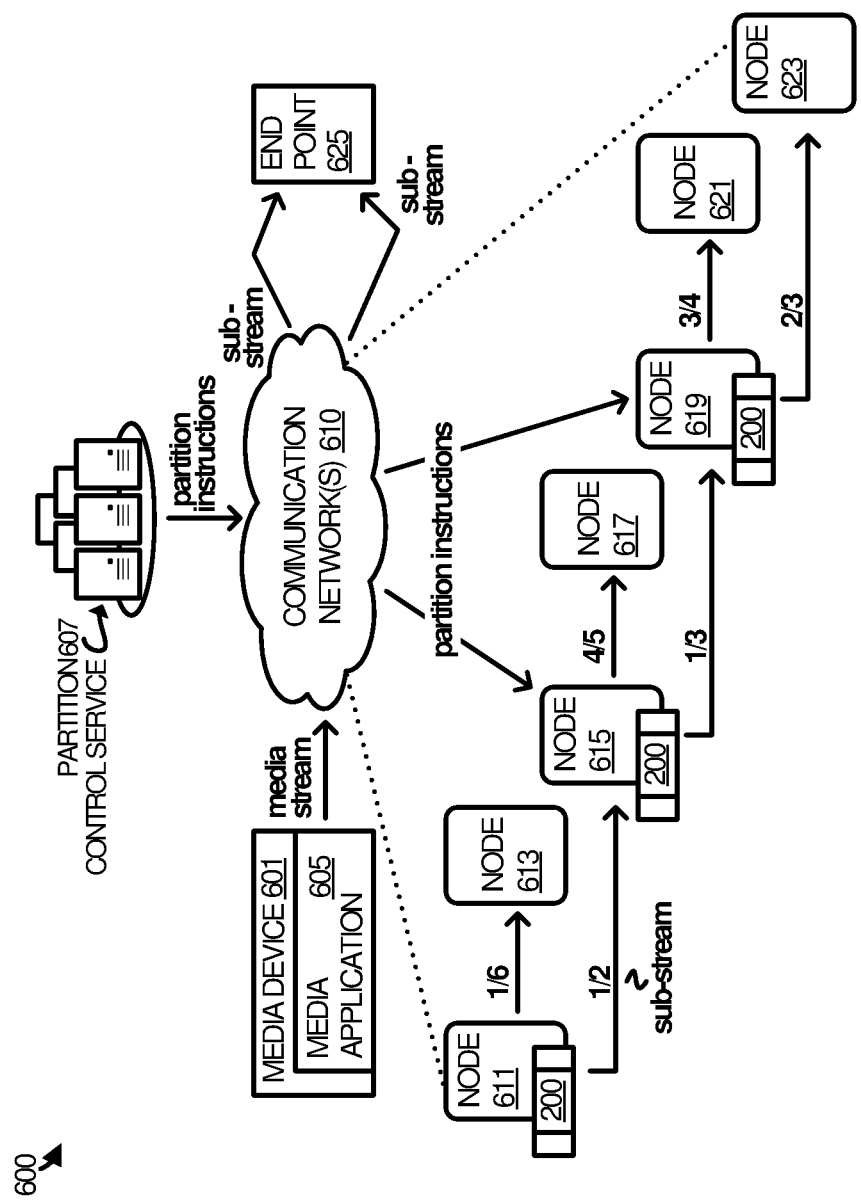
FIG. 6 illustrates another operational environment in an implementation of media stream partitioning.

FIG. 6 illustrates operational environment 600 in another implementation. Operational environment 600 includes media device 601, end point 625, and communication network 610. Communication network 610 includes various nodes, represented by node 611, node 613, node 615, node 617, node 619, node 621, and node 623. Operational environment 600 also includes partition control service 607, which may communicate with one or more of nodes 611, 613, 615, 617, 619, 621, and 623 to control the partition of one or more media streams sent from media application 605 on media device 601.

Media device 601 is representative of any device capable of hosting a media application and communicating with one or more end points. Examples of media device 601 include, but are not limited to, mobile phones, table computers, laptop computers, desktop computers, and any other variation or combination thereof. Media device 601 may include various hardware and software elements, examples of which are described below with respect to computing system 701 in FIG. 7. End point 625 is also representative of such devices. A user operating media device 601 may engage with end point 625 in a voice or video telephony session (call), a media download session, a media upload session, or any other type of data transfer or exchange between end points.

Media application 605 runs on media device 601. Examples of media application 605 include telephony applications (voice and video calling), messaging applications, and chat applications, as well as any variation or combination thereof. Media application 605 may be implemented as a stand-alone application, as a distributed application, or as an integrated component of one or more other applications.

Partition control service 607 is a service capable of formulating and providing partition instructions to one or more nodes in a communication network. Partition control service 607 may be implemented as a stand-alone service or as a sub-service integrated within the context of a larger service, such as Skype®, Skype® for Business, and Office 365®. Partition control service 607 may be implemented in software executed by one or more physical or virtual server computers, such as computing system 701 in FIG. 7.

The partition instructions may specify how a network node is to partition an encoded media stream. The media stream may comprise an encoded bit stream. The encoding may comprise forward error correction encoding that adds redundant bits to an original media stream, which may itself be compressed or uncompressed at the time of encoding. The partition instructions specify at what interval to split the bit stream into multiple bit streams. For example, the partition instructions may specify that the bit stream be split evenly into two or more streams, weighted unevenly amongst two or more streams, or otherwise partitioned. In a simple example, one-quarter of the bits may be allocated to one sub-stream, while three-quarters of the bits may be allocated to another sub-stream.

Communication network 610 is representative of one or more networks over which media device 601 may communicate with end point 625. Examples of communication network 610 include, but are not limited to, wireless networks, wired networks, local area networks (LANs), wide area networks (WANs), virtual networks, software defined networks, internets, intranets, the Internet, or any other type of network or combination thereof.

Nodes 611-623 are representative of the various network elements that may comprise communication network 610. Any one or more of nodes 611-623 may employ a partition process the same as or similar to partition process 200. Examples include, but are not limited to, switches, routers, repeaters, wireless access points, bridges, hubs, servers, and any physical, virtual, or logical variation or combination thereof. Nodes 611-623 may each include various hardware and software elements, examples of which are described below with respect to computing system 701 in FIG. 7.

In operation, media application 605 produces a media stream that is sent to communication network 610. Partition control service 607 provides partition instructions to any one or more of nodes 611-623 instructing the nodes on how to partition the media stream produced by media application 605 or any of the sub-streams possibly partitioned by the downstream nodes. Ultimately, one or more of the resulting sub-streams are received by end-point 625. End-point 625 may attempt to reconstruct the original media stream which as much fidelity as possible, so as to play out the audio or video content included therein, store the file(s) transferred within the stream, or other handle the stream accordingly.

In this example, the partition instructions instruct node 611 to partition a media stream into two sub-streams having a $1/6^{th}$ code rate and a 1/2 code rate respectively. Node 611 communicates the sub-streams to two or more downstream nodes. (It may be appreciated that one or more other nodes may optionally reside between node 611 and either one or both of node 613 and node 615.) Node 613 receives one of the sub-streams, performs no further partitioning, and transmits on the sub-stream with the $1/6^{th}$ code rate for delivery to end-point 625, which may include traversing other nodes (not shown).

The partition instructions instruct node 615 to partition the sub-stream produced by node 611 with a 1/2 code rate into two sub-streams having a $4/5^{ths}$ code rate and a $1/3^{rd}$ code rate respectively. Node 615 communicates the sub-streams to two or more downstream nodes. (It may be appreciated that one or more other nodes may optionally reside between node 615 and either one or both of node 617 and node 619.) Node 617 performs no further partitioning and transmits on the sub-stream with the $4/5^{ths}$ code rate for delivery to end-point 625, which may include traversing other nodes (not shown).

Node 619 receives instructions to partition the sub-stream having the $1/3^{rd}$ code rate into two sub-streams having a $3/4^{ths}$ code rate and a $2/3^{rd}$s code rate respectively. Node 619 then communicates the sub-streams to two or more downstream nodes. (It may be appreciated that one or more other nodes may optionally reside between node 619 and either one or both of node 621 and node 623.) Node 621 performs no further partitioning and transmits on the sub-stream with the 3/4$^{th}$ s code rate for delivery to end-point 625, which may include traversing other nodes (not shown). Node 623 performs also no further partitioning and transmits on the sub-stream with the 3/4$^{th}$ s code rate for delivery to end-point 625, which may include traversing other nodes (not shown).

While nodes 613, 617, 621, and 623 are described herein as performing no further partitioning, in some implementation it may be the case that one or more of the nodes does in fact perform additional partitioning. In addition, while the scenario illustrated in FIG. 6 involves nodes 611, 615, and 619 performing partitioning, it may be appreciated that all three need not perform partitioning in every implementation. Rather, partitioning occurring at any combination of one or more nodes may be considered within the scope of the present disclosure.

In some implementations, media application 605 itself may partition the media stream. For example, media application 605 could encode its media stream and partition it into the 1/6$^{th}$ and 1/2 code rates sub-streams. Node 611 would then partition the 1/2 rated sub-stream into the 4/5$^{ths}$ and 1/3$^{rd}$ rated sub-streams. Node 615 would partition the 1/3$^{rd}$ rated sub-stream into the 3/4$^{ths}$ and 2/3$^{rd}$ s rated sub-streams, while node 619 would possibly refrain from performing any partitioning.

In such a scenario, media application 605 could identify a partition schema to apply to a media stream for an ongoing media session between the media application and another end-point (e.g. another media application, a server, or the like). Media application 605 may identify the partition schema itself, by referencing local information that specifies which partition schema to utilize under which circumstances. In other implementations, the media application may communicate with partition control service 607 to identify the partition schema, allowing the determination of the schema to be offloaded to partition control service 607. In yet another implementation, media application 605 may query another application or software component (e.g. an operating system element) external to the application to identify the partition schema.

The partition schema may specify how the media application is to partition an encoded or un-encoded media stream. The media stream may comprise a compressed bit stream or a compressed and encoded bit stream. The partition schema specifies at what interval to split the bit stream into multiple bit streams. For example, the partition schema may specify that the bit stream be split evenly into two or more streams, weighted unevenly amongst two or more streams, or otherwise partitioned. In a simple example, one-quarter of the bits may be allocated to one sub-stream, while three-quarters of the bits may be allocated to another sub-stream.

Media application 605 may partition the media stream, such that each sub-stream has a code rate that differs relative to the other sub-streams. In the case of a compressed and encoded bit stream, the resulting sub-streams from the partition will remain in an encoded state and, due to the partitioning, will exhibit different code rates relative to each other. In the case of a compressed but un-encoded bit stream, the partitioned sub-streams are routed through one or more encoding blocks that can apply error correction encoding to the partitioned sub-streams. The output from the encoding bock(s) would thus be multiple compressed and encoded sub-streams partitioned from the original bit stream and having different code rates relative to each other.

The partitioned sub-streams may then be transmitted to multiple wireless access points for transport over a network(s) to an endpoint. Each sub-stream may be transmitted to a different wireless access point. For example, one sub-stream partitioned from a bit stream may be transmitted to one wireless access point, while another sub-stream partitioned from the same bit stream may be transmitted to another wireless access point, and so on if more than two wireless access points are utilized.

Figure 7:
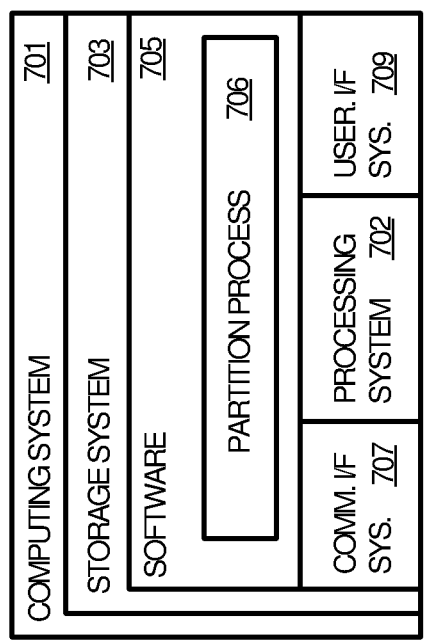
FIG. 7 illustrates a computing system suitable for implementing the partitioning technology disclosed herein, including any of the environments, architectures, elements, processes, and operational scenarios and sequences illustrated in the Figures and discussed below in the Technical Disclosure.

FIG. 7 illustrates computing system 701, which is representative of any system or collection of systems in which the various nodes, applications, services, scenarios, and processes disclosed herein may be implemented. Examples of computing system 701 include, but are not limited to, routers, switches, hubs, bridges, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes partition process 706, which is representative of the processes discussed with respect to the preceding FIGS. 1-7, including partition process 200. When executed by processing system 702 to provide media stream partitioning, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing a media application, a network node, and/or a partition control service.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include partition process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide media stream partitioning and/or control. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A device comprising:
   a processor; and
   a memory in communication with the processor, the memory comprising executable instructions that, when executed by the processor, cause the processor to control the device to perform functions of:
      receiving a media stream for a multimedia session from an upstream node in a communication channel supporting the multimedia session;
      partitioning the media stream into a plurality of sub-streams with differing error corrections created by varying a code rate of each sub-stream of the plurality of sub-streams relative to each other, wherein the code rate represents a level of redundancy of bits within one of the plurality of sub-streams relative to bits in the media stream; and
      transmitting the plurality of sub-streams to a plurality of downstream nodes over a plurality of channels supporting the multimedia session.

2. The device of claim 1, wherein the media stream comprises one of a plurality of source sub-streams previously partitioned from a source media stream at a source of the multimedia session to vary the code rate of each of the plurality of source sub-streams relative to each other.

3. The device of claim 1, wherein the media stream comprises one of a plurality of intermediate sub-streams previously partitioned from an intermediate media stream at the upstream node to vary the code rate of each of the plurality of intermediate sub-streams relative to each other.

4. The device of claim 3, wherein the intermediate media stream comprises one of a plurality of source sub-streams previously partitioned from a source media stream at a source of the multimedia session to vary the code rate of each of the plurality of source sub-streams relative to each other.

5. The device of claim 1, wherein the instructions, when executed by the processor, further cause the processor to control the device to perform a function of implementing, at times during the multimedia session, a modification to the code rate for each of the plurality of sub-streams.

6. The device of claim 5, wherein, for partitioning the media stream, the instructions, when executed by the processor, further cause the processor to control the device to perform a function of partitioning the media stream in accordance with a schema provided by a partition control service.

7. The device of claim 6, wherein the instructions, when executed by the processor, further cause the processor to control the device to perform a function of receiving an update to the schema from the partition control service that identifies the modification to implement with respect to code rate for each of the plurality of sub-streams.

8. The device of claim 1, wherein:
   the media stream comprises a compressed and encoded bit stream,
   the compressed and encoded bit stream comprises a plurality of information bits and a plurality of redundant bits, and
   each of the plurality of sub-streams comprises, relative to each other, a different subset of the plurality of information bits and a different subset of the plurality of redundant bits.

9. A method of operating a device, the method comprising:
   receiving a media stream for a multimedia session from an upstream node in a communication channel supporting the multimedia session;
   partitioning the media stream into a plurality of sub-streams with differing error corrections created by varying a code rate of each sub-stream of the plurality of sub-streams relative to each other, wherein the code rate represents a level of redundancy of bits within one of the plurality of sub-streams relative to bits in the media stream; and
   transmitting the plurality of sub-streams to a plurality of downstream nodes over a plurality of channels supporting the multimedia session.

10. The method of claim 9, wherein the media stream comprises one of a plurality of source sub-streams previously partitioned from a source media stream at a source of the multimedia session to vary the code rate of each of the plurality of source sub-streams relative to each other.

11. The method of claim 10, wherein the media stream comprises one of a plurality of intermediate sub-streams previously partitioned from an intermediate media stream at the upstream node to vary the code rate of each of the plurality of intermediate sub-streams relative to each other.

12. The method of claim 11, wherein the intermediate media stream comprises one of a plurality of source sub-streams previously partitioned from a source media stream at a source of the multimedia session to vary the code rate of each of the plurality of source sub-streams relative to each other.

13. The method of claim 9, further comprising, at times during the multimedia session, implementing a modification to the code rate for each of the plurality of sub-streams.

14. The method of claim 13, wherein partitioning the media stream comprises partitioning the media stream in accordance with a schema provided by a partition control service.

15. The method of claim 14, further comprising receiving an update to the schema from the partition control service that identifies the modification to implement with respect to code rate for each of the plurality of sub-streams.

16. The method of claim 9, wherein:
   the media stream comprises a compressed and encoded bit stream, and wherein the compressed and encoded bit stream comprises a plurality of information bits and a plurality of redundant bits, and each of the plurality of sub-streams comprises, relative to each other, a different subset of the plurality of information bits and a different subset of the plurality of redundant bits.

17. A non-transitory computer readable storage medium containing instructions which, when executed by a processor, cause a computer to perform functions of:
   receiving a media stream for a multimedia session from an upstream node in a communication channel supporting the multimedia session;
   partitioning the media stream into a plurality of sub-streams with differing error corrections created by varying a code rate of each sub-stream of the plurality of sub-streams relative to each other, wherein the code rate represents a level of redundancy of bits within one of the plurality of sub-streams relative to bits in the media stream; and
   transmitting the plurality of sub-streams to a plurality of downstream nodes over a plurality of channels supporting the multimedia session.

18. The non-transitory computer readable storage medium of claim 17, wherein the media stream comprises one of a plurality of intermediate sub-streams previously partitioned from an intermediate media stream at the upstream node to vary the code rate of each of the plurality of intermediate sub-streams relative to each other.

19. The non-transitory computer readable storage medium device of claim 18, wherein the intermediate media stream comprises one of a plurality of source sub-streams previously partitioned from a source media stream at a source of the multimedia session to vary the code rate of each of the plurality of source sub-streams relative to each other.

20. The non-transitory computer readable storage medium of claim 17, wherein:
   the media stream comprises a compressed and encoded bit stream,
   the compressed and encoded bit stream comprises a plurality of information bits and a plurality of redundant bits, and
   each of the plurality of sub-streams comprises, relative to each other, a different subset of the plurality of information bits and a different subset of the plurality of redundant bits.

\* \* \* \* \*